United States Patent
Harris et al.

(10) Patent No.: US 11,449,545 B2
(45) Date of Patent: Sep. 20, 2022

(54) DEDUPLICATION OF MEDIA FILE SEARCH RESULTS

(71) Applicant: Snap Inc., Santa Monica, CA (US)

(72) Inventors: Jeffrey Harris, Alberta (CA); Kenneth Au, Edmonton (CA); Richard Rabbat, Palo Alto, CA (US); Ernestine Fu, Northridge, CA (US)

(73) Assignee: Snap Inc., Santa Monica, CA (US)

( * ) Notice: Subject to any disclaimer, the term of this patent is extended or adjusted under 35 U.S.C. 154(b) by 58 days.

(21) Appl. No.: 15/930,127

(22) Filed: May 12, 2020

(65) Prior Publication Data

US 2020/0364262 A1 Nov. 19, 2020

Related U.S. Application Data

(60) Provisional application No. 62/847,204, filed on May 13, 2019.

(51) Int. Cl.
| | |
|---|---|
| *G06F 16/732* | (2019.01) |
| *G06F 16/71* | (2019.01) |
| *G06F 16/174* | (2019.01) |
| *G06F 16/75* | (2019.01) |
| *G06F 16/13* | (2019.01) |
| *G06F 16/738* | (2019.01) |

(52) U.S. Cl.
CPC ........ *G06F 16/7328* (2019.01); *G06F 16/137* (2019.01); *G06F 16/174* (2019.01); *G06F 16/71* (2019.01); *G06F 16/738* (2019.01); *G06F 16/75* (2019.01)

(58) Field of Classification Search
CPC .. G06F 16/7328; G06F 16/137; G06F 16/174; G06F 16/71; G06F 16/738; G06F 16/75
USPC .......................................................... 707/747
See application file for complete search history.

(56) References Cited

U.S. PATENT DOCUMENTS

| | | | | |
|---|---|---|---|---|
| 7,392,467 B2 * | 6/2008 | Jun | ..................... | H04N 21/8453 |
| | | | | 715/713 |
| 7,475,061 B2 * | 1/2009 | Bargeron | ............. | G06V 30/414 |
| | | | | 707/E17.022 |
| 8,285,718 B1 * | 10/2012 | Ong | ..................... | G06F 16/7834 |
| | | | | 707/737 |
| 8,290,918 B1 * | 10/2012 | Ioffe | ...................... | G06F 16/41 |
| | | | | 707/698 |

(Continued)

OTHER PUBLICATIONS

Khelifi et al., "Perceptual Video Hashing for Content Identification and Authentication", IEEE Transactions on Circuits and Systems for Video Technology, vol. 29, No. 1, Jan. 2019, pp. 50-67. (Year: 2019).*

(Continued)

*Primary Examiner* — Phuong Thao Cao
(74) *Attorney, Agent, or Firm* — Schwegman Lundberg & Woessner, P.A.

(57) ABSTRACT

In a method for identifying visually similar media content items, perceptual hashes for video frames of media content items are received. The perceptual hashes are compared for at least a portion of video frames. Based on the comparing the perceptual hashes for at least a portion of video frames, it is determined whether media content items are matching. The media content items indicated as matching are grouped.

14 Claims, 7 Drawing Sheets

(56) References Cited

U.S. PATENT DOCUMENTS

| | | | | |
|---|---|---|---|---|
| 8,335,786 B2* | 12/2012 | Pereira | G06K 9/00758 | 707/728 |
| 8,611,422 B1* | 12/2013 | Yagnik | G06F 16/7834 | 375/240.16 |
| 8,611,617 B1* | 12/2013 | Baluja | G06V 10/751 | 382/224 |
| 8,788,500 B2* | 7/2014 | Contractor | G06F 16/3344 | 707/740 |
| 8,868,569 B2* | 10/2014 | Chandiramani | G06F 16/783 | 707/749 |
| 9,146,990 B2* | 9/2015 | Scherf | G06F 16/951 | |
| 9,148,707 B2* | 9/2015 | DiLorenzo | H04N 21/478 | |
| 10,152,479 B1* | 12/2018 | Granstrom | G06F 16/483 | |
| 10,158,907 B1* | 12/2018 | Wang | G06F 16/7834 | |
| 10,346,474 B1* | 7/2019 | Kalampoukas | G06F 16/24578 | |
| 10,491,782 B1* | 11/2019 | Zehler | G06F 3/1238 | |
| 10,631,036 B1* | 4/2020 | Rabbat | H04N 21/4318 | |
| 10,936,412 B1* | 3/2021 | Visvanathan | G06F 12/0866 | |
| 2009/0089326 A1* | 4/2009 | Balasubramanian | G06F 16/958 | |
| 2009/0092375 A1* | 4/2009 | Berry | H04N 5/913 | 386/248 |
| 2009/0263014 A1* | 10/2009 | Zhang | G06K 9/4652 | 382/165 |
| 2010/0306193 A1* | 12/2010 | Pereira | G06F 16/783 | 707/728 |
| 2011/0106798 A1* | 5/2011 | Li | G06F 16/58 | 707/728 |
| 2011/0122255 A1* | 5/2011 | Haritaoglu | G06F 16/7834 | 348/180 |
| 2011/0208744 A1* | 8/2011 | Chandiramani | G06F 16/738 | 707/741 |
| 2011/0222787 A1* | 9/2011 | Thiemert | G06F 16/785 | 382/225 |
| 2012/0087583 A1* | 4/2012 | Yang | G06F 16/7847 | 382/218 |
| 2012/0189212 A1* | 7/2012 | Ren | G06K 9/00758 | 382/218 |
| 2013/0011008 A1* | 1/2013 | Ikezoye | G06F 16/41 | 382/100 |
| 2013/0177252 A1* | 7/2013 | Hefeeda | G06K 9/00744 | 382/218 |
| 2013/0326573 A1* | 12/2013 | Sharon | H04H 60/73 | 725/115 |
| 2014/0195643 A1* | 7/2014 | Liu | H04N 21/23109 | 709/217 |
| 2014/0254934 A1* | 9/2014 | Laxminarayana Bhat | G06F 16/58 | 382/173 |
| 2015/0309701 A1* | 10/2015 | Jätzold | G06F 3/04883 | 715/765 |
| 2016/0048849 A1* | 2/2016 | Shiftan | G06Q 50/01 | 705/7.29 |
| 2017/0048534 A1* | 2/2017 | Croxford | H04N 19/40 | |
| 2017/0244999 A1* | 8/2017 | Chen | G06F 16/48 | |
| 2017/0251248 A1* | 8/2017 | Lee | H04N 21/84 | |
| 2017/0330363 A1* | 11/2017 | Song | G06T 13/80 | |
| 2017/0371963 A1* | 12/2017 | Bilobrov | G06F 16/2237 | |
| 2017/0372142 A1* | 12/2017 | Bilobrov | G06K 9/00751 | |
| 2018/0053039 A1* | 2/2018 | Anders | G06V 20/48 | |
| 2018/0089204 A1* | 3/2018 | Clark | G06K 9/00758 | |
| 2018/0101540 A1* | 4/2018 | Stoop | G06F 16/7867 | |
| 2018/0137367 A1* | 5/2018 | Pavetic | G06K 9/00758 | |
| 2018/0192101 A1* | 7/2018 | Bilobrov | G06F 16/907 | |
| 2019/0007476 A1* | 1/2019 | Rabbat | H04L 65/80 | |
| 2019/0108401 A1* | 4/2019 | Chen | G06K 9/00758 | |
| 2019/0251114 A1* | 8/2019 | Pereira | G06F 16/951 | |
| 2019/0342594 A1* | 11/2019 | Korte | H04N 21/2407 | |
| 2020/0068259 A1* | 2/2020 | Gordon | H04N 21/23892 | |
| 2020/0154165 A1* | 5/2020 | Cohen | H04N 21/812 | |
| 2020/0341690 A1* | 10/2020 | Saad | G06F 3/0608 | |
| 2020/0356758 A1* | 11/2020 | Armstrong | G06V 40/1365 | |

OTHER PUBLICATIONS

Vega et al., "A Robust Video Identification Framework using Perceptual Image Hashing", The 43rd Latin American Computer Conference (CLEI), IEEE, Sep. 4-8, 2017, 10 pages. (Year: 2017).*

* cited by examiner

DEDUPLICATION OF MEDIA FILE SEARCH RESULTS

RELATED APPLICATIONS

This application claims priority to and the benefit of co-pending U.S. Patent Provisional Patent Application 62/847,204, filed on May 13, 2019, entitled "DEDUPLICATION OF MEDIA FILES," by Harris et al., and assigned to the assignee of the present application, which is incorporated herein by reference in its entirety.

BACKGROUND

Media content hosting companies, particularly those that allow for public file sharing, often receive multiple versions of content items that are identical or substantially identical. In other words, multiple content items can be received that have minor differences, such as different resolutions or different formats, but include substantially identical content. As a result, a user performing a search at such a hosting company, e.g., a video hosting company, may receive multiple visually similar pieces of content in the search results. As such, the quality of the search results may be impacted as visually similar items may be shown at the top of the results, reducing the number of visually different content items presented.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1A:
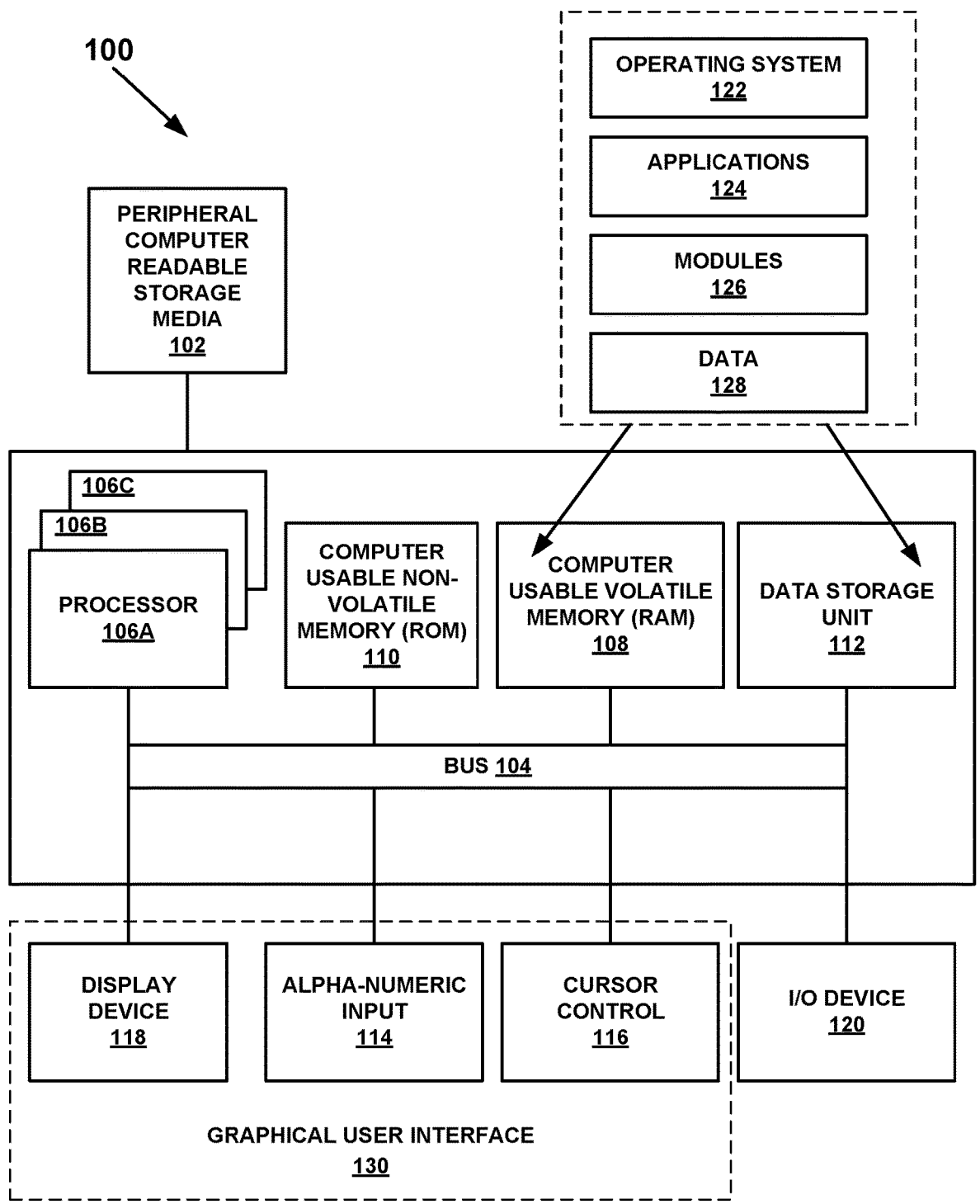
FIG. 1A illustrates an example computer system upon which embodiments described herein be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "comparing," "determining," "grouping," "indicating," "generating," "returning," "marking," "partitioning," "scanning," or the like, refer to the actions and processes of an electronic device such as: a processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Examples of systems for grouping of visually similar media files are then described. Example operations for deduplication of media file search results are then described.

In accordance with various embodiments, methods and systems for identifying visually similar media content items, are described. In one embodiment, perceptual hashes for video frames of media content items are received. The perceptual hashes are compared for at least a portion of video frames. Based on the comparing the perceptual hashes for at least a portion of video frames it is determined whether media content items are matching. Media content items indicated as matching are grouped together.

Embodiments described herein provide methods and systems for consolidating visually similar content from search results. In some embodiments, a media content item library is accessed and analyzed to identify visually similar media content items. In some embodiments, as a new media content item is added to a media content item library, the new media content item is analyzed and compared to the media content item library, to determine whether it is visually similar to items within the media content item. Media content items that are determined to be visually similar are grouped together, such that search results for a search including the visually similar media content items will only return one representative media content item for the grouped items.

Perceptual hashing, as utilized herein, refers to an algorithm or function that is applied to a media file for generating a fingerprint or signature for the media file where the greater the similarity between two media files, the greater the similarity between the perceptual hashes for the two media files. In some embodiments, the output of a perceptual hashing function is a string or sequence, referred to herein as a perceptual hash. For example, two images that are visually similar to a person will have perceptual hashes that are similar, while two images that are visually much different to a person will have perceptual hashes that are less similar. Perceptual hashing can be contrasted with cryptographic hashing where slight variances in the input drastically change the output. Perceptual hashing is useful in determining whether two images are similar. Example perceptual hash functions include phash and dhash, but other types of perceptual hash functions exist and may be utilized herein, in accordance with the described embodiments. In various embodiments, perceptual hashing is utilized in the context of video files by generating perceptual hashes for frames of the video files.

In accordance with various embodiments described herein, similarity between media files, e.g., images or frames of videos, is determined by comparing perceptual hashes for the media files. An edit distance, also referred to herein as a "distance," between the perceptual hashes is determined. As utilized herein, an edit distance refers to a measure of difference between two sequences or strings. For example, edit distance is a measurement of how dissimilar two strings or sequences are to one another by counting the minimum number of operations required to transform one string into the other. Various types distance determinations may be utilized in accordance with the described embodiments, including and without limitation, the Levenshtein distance, the Hamming distance, the Damerau-Levenshtein distance, and the longest common sequence (LCS).

Embodiments described herein pertain to identification of visually similar video content items. In one embodiment, the video content item is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that video content item can be looped (e.g., via a HTML 5 video element or Flash video element) to automatically repeat. In some embodiments, the video content item is a short form looping video file (e.g., less than 60 seconds).

Embodiments described herein pertain to identifying visually similar video content within a media content item library. For video content items, at least one perceptual hash based on a frame of each video content item is generated. In some embodiments, multiple perceptual hashes for each video content item are generated. For example, frames can be generated for the video content items at a particular rate, e.g., one frame per second, and a perceptual hash is generated for each frame.

In some embodiments, a candidate list of media content items can be generated. The perceptual hashes for each of the media content items can be partitioned into a number of words or segments. These words can be stored in a key value database, allowing for expedient analysis of loosely matching media content items. The loosely matching media content items will include visually similar media content items and possibly false positives. The loosely matching media content items are referred to herein as a candidate list of media content items.

Once a candidate list of media content items is generated, perceptual hashes for the video frames of the media content items can be analyzed. It should be appreciated that the candidate list includes all media content items or any other number of media content items. Perceptual hashes for video frames of the media content items are generated and stored. The perceptual hashes are compared for the candidate list of media content items. Based on the comparing, it is determined whether media content items are matching. Media content items indicated as matching are grouped together such that search results will only return one of the media content items grouped as matching, so as to eliminate visually duplicate items from the search results.

In some embodiments, the comparing the perceptual hashes includes determining distances between the perceptual hashes for pairs of media content items. In some embodiments, the distance is compared to a distance threshold. If the distance satisfies the distance threshold, e.g., is not greater than the distance threshold, the pair of media content items is identified as matching. In other words, these two media content items, while possibly not identical, or visually similar such that a user would perceive them as the same. In some embodiments, the media content items are marked within the media content library as matching. In some embodiments, the media content items are marked as matching in the search index.

In some embodiments, media content items marked as matching are ranked according to various factors, such that the search results return the one media content item representative of the matching media content items according to the factors. The factors may include, without limitation: resolution, quality, etc.

In some embodiments, as new media content items are received at a media content item library, the new media content items are analyzed to determine whether they are visually similar to items of the media content items library. A perceptual hash is generated for the new media content item. In some embodiments, the perceptual hash for the new media content items is partitioned into a number of words or segments. These words are stored in a key value database, and an analysis is performed to identify the candidate list based on the words in the key value database.

The perceptual hash for the new media content item is compared to perceptual hashes for the candidate list or all media content items (e.g., where no candidate list is generated). Based on the comparing, it is determined whether the new media content item matches a media content item of the media content item library. Provided the new media content item matches a media content item of the media content item library, the new media content item is grouped with the media content item of the media content item library and marked as matching. The media content library is updated accordingly.

In some embodiments, a search query is received at the media content item library. The search is performed, and search results to the search query are returned, where the media content items indicated as matching are returned as a single result within the search results. In this manner, only visually dissimilar media content items are returned in the initial search results. In some embodiments, the single result is selectable such that the visually similar items can be reviewed such that a user can select one of the matching items.

As presented above, identification of visually similar media content items, is important for facilitating the use of digital content. Providing search results that consolidate visually similar items into a single result improves the performance of digital content search by providing more diverse and representative results. The described embodiments may also be used to identify a history of a particular media content item, determining a first or early appearance of the item, as well as useful in identifying copyright violations, and tracing memes. Hence, the embodiments of the present invention greatly extend beyond conventional methods of identification of visually similar media content items. Moreover, embodiments of the present invention amount to significantly more than merely using a computer to perform identification of visually similar media content items. Instead, embodiments of the present invention specifically recite a novel process, rooted in computer technology, utilizing perceptual hashes for determining similar media content items, and providing search results based on the similar media content items such that duplicative information is not presented to a user, improving the user experience.

Example Computer System and Communication Network

Turning now to the figures, FIG. 1A is a block diagram of an example computer system 100 upon which embodiments of the present invention can be implemented. FIG. 1A illustrates one example of a type of computer system 100 (e.g., a computer system) that can be used in accordance with or to implement various embodiments which are discussed herein.

It is appreciated that computer system 100 of FIG. 1A is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1A is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1A includes an address/data bus 104 for communicating information, and a processor 106A coupled with bus 104 for processing information and instructions. As depicted in FIG. 1A, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 106B, and 106C. Computer system 100 also includes an cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1A, display device 118 of FIG. 1A may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1A, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 1B:
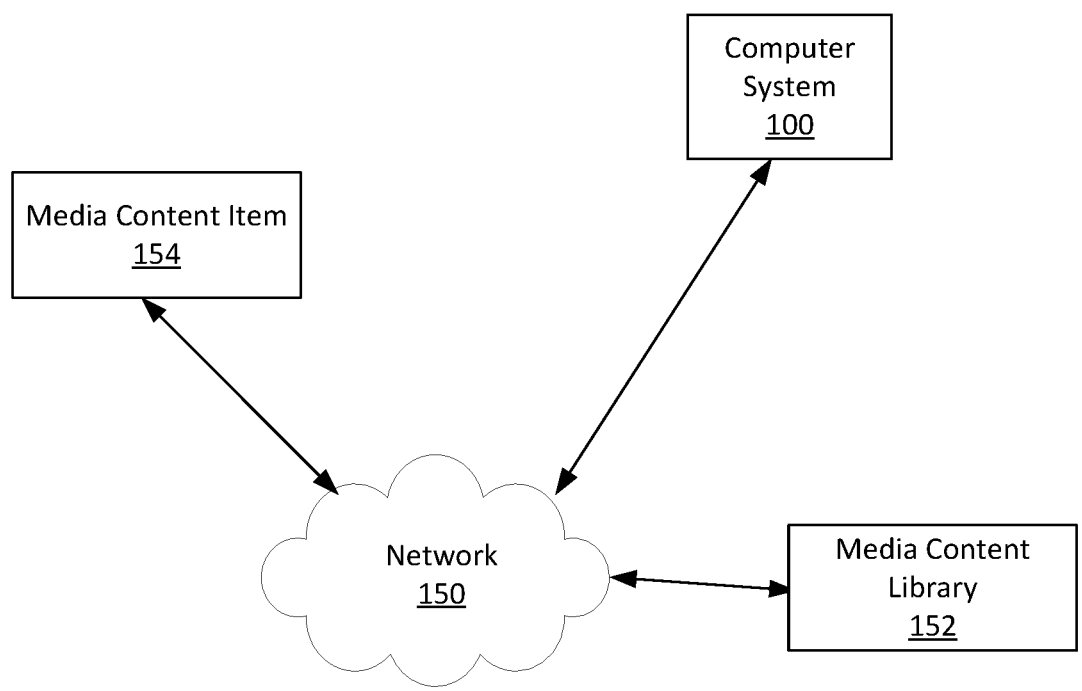
FIG. 1B illustrates an example communication network upon which embodiments described herein may be implemented.

FIG. 1B illustrates an example communication network 150 upon which embodiments described herein may be implemented. FIG. 1B illustrates computer system 100, media content library 152, and media content item 154, all of which are communicatively coupled via network 150. It should be appreciated that computer system 100, media content library 152, and media content item 154, may be implemented as a computer system 100 or as another computer system.

In one embodiment, media content library 152 is a server computer system including a plurality of digital video content items. A media file can be any type of file that can be rendered on an electronic device (e.g., a prerecorded video file). It should be appreciated that any type of media file format can be used in accordance with the described embodiments, including but not limited to Graphics Interchange Format (GIF), WebM, WebP, MPEG-4 (MP4), Animated Portable Network Graphics (APNG), Motion JPEG, Flash video (FLV), Windows Media video, M4V, etc.

Example Deduplication of Media File Search Results

Embodiments described herein provide methods and systems for consolidating visually similar content from search results. In some embodiments, a media content item library is accessed and analyzed to identify visually similar media content items. In some embodiments, as a new media content item is added to a media content item library, the new media content item is analyzed and compared to the media content item library, to determine whether it is visually similar to items within the media content item. Media content items that are determined to be visually similar are grouped together, such that search results for a search including the visually similar media content items will only return one representative media content item for the grouped items.

Figure 2:
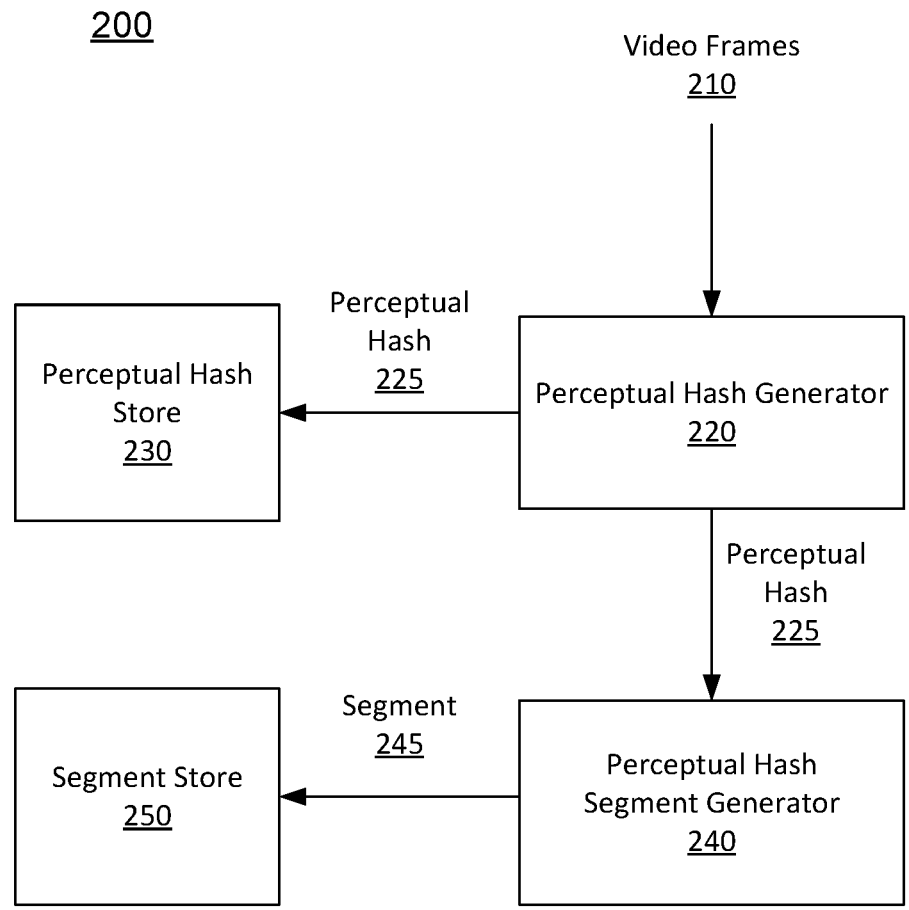
FIG. 2 illustrates an example perceptual hash and segment generation system, according to an embodiment.

FIG. 2 illustrates an example perceptual hash and segment generation system 200, according to an embodiment. System 200 includes perceptual hash generator 220, perceptual hash store 230, perceptual hash segment generator 240, and segment store 250. It should be appreciated that the components of system 200 may be included within any combination of electronic devices, e.g., computer system 100 and/or a distributed computing system.

Perceptual hash generator 220 is configured to receive video frames 210, where each video frame 210 is associated with a media content item (e.g., a short form looping video file). In some embodiments, the video frames are received from a media content library (e.g., media content library 152). For instance, system 200 may access a media content library for perceptual hash and segment generation. In some embodiments, the video frames are received from a media content item (e.g., media content item 154). For instance, system 200 may receive individual media content items as submitted.

Embodiments described herein pertain to identification of visually similar media (e.g., video) content items. In one embodiment, the video content item is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that video content item can be looped (e.g., via a HTML 5 video element or Flash video element) to automatically repeat. In some embodiments, the video content item is a short form looping video file (e.g., less than 60 seconds).

Perceptual hash generator 220 is configured to generate at least one perceptual hash 225 based on at least one video frame 210 of each video content item. In some embodiments, multiple perceptual hashes 225 for each video content item are generated, e.g., using multiple video frames 210. For example, video frames 210 can be generated for the video content items at a particular rate, e.g., one frame per second, and a perceptual hash 225 is generated for each frame 210.

Perceptual hashing, as utilized herein, refers to an algorithm or function that is applied to a media file for generating a fingerprint or signature for the media file where the greater the similarity between two media files, the greater the similarity between the perceptual hashes for the two media files. In some embodiments, the output of a perceptual hashing function is a string or sequence, referred to herein as a perceptual hash. For example, two images that are visually similar to a person will have perceptual hashes that are similar, while two images that are visually much different to a person will have perceptual hashes that are less similar. Perceptual hashing can be contrasted with cryptographic hashing where slight variances in the input drastically change the output. Perceptual hashing is useful in determining whether two images are similar. Example perceptual hash functions include phash and dhash, but other types of perceptual hash functions exist and may be utilized herein, in accordance with the described embodiments. In various embodiments, perceptual hashing is utilized in the context of video files by generating perceptual hashes for frames of the video files.

Perceptual hashes 225 as generated by perceptual hash generator 220 are stored at perceptual hash store 230. It should be appreciated that perceptual hashes 225 stored at perceptual hash store 230 are associated with an identified media content item (e.g., media content items stored in a media content library 152).

Perceptual hash segment generator 240 receives the perceptual hashes 225, and is configured to generate segments 245 for the perceptual hashes 225. In some embodiments, perceptual hash segment generator 240 is configured to partition the perceptual hashes 225 into a number of words or segments 245, which are smaller and more loosely matching components of the perceptual hashes 225. Words or segments 245 are stored in segment store 250. In some embodiments, segment store 250 is a key value database, allowing for expedient analysis of loosely matching media content items. The loosely matching media content items will include visually similar media content items and possibly false positives.

Figure 3:
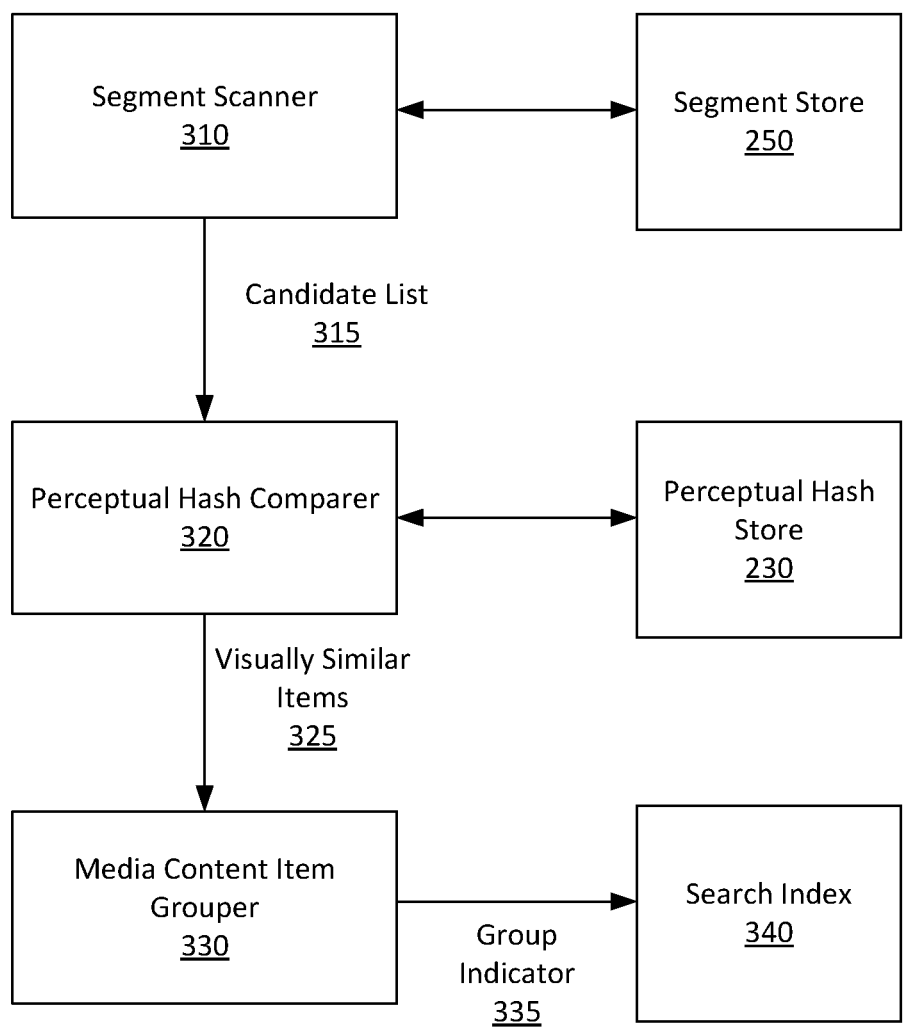
FIG. 3 illustrates an example system for grouping visually similar content, according to an embodiment.

FIG. 3 illustrates an example system 300 for grouping visually similar content, according to an embodiment. System 300 includes segment scanner 310, perceptual hash comparer 320, and media content item grouper 330. It should be appreciated that the components of system 300 may be included within any combination of electronic devices, e.g., computer system 100 and/or a distributed computing system.

Segment scanner 310 is configured to access segment store 250 and compare segments 245 of segment store 250 for similar segments 245. Segments 245 are smaller than perceptual hashes 225, and can be compared quickly for similar segments based on similarity between the segments, resulting in identification of loosely matching media content items that will include visually similar media content items and possibly false positives. The loosely matching media content items are referred to herein as a candidate list 315 of media content items.

Once a candidate list 315 of media content items is generated, perceptual hashes for the video frames of the media content items can be analyzed at perceptual hash comparer 320. It should be appreciated that the candidate list 315 includes all media content items or any other number of media content items. Perceptual hash comparer 320 is configured to access perceptual hash store 230 to retrieve and compare perceptual hashes for the candidate list 315. Based on the comparing, perceptual hash comparer 320 determines whether media content items are matching by identifying visually similar items 325.

In accordance with various embodiments described herein, similarity between media files, e.g., images or frames of videos, is determined by comparing perceptual hashes for the media files. An edit distance, also referred to herein as a "distance," between the perceptual hashes is determined. As utilized herein, an edit distance refers to a measure of difference between two sequences or strings. For example, edit distance is a measurement of how dissimilar two strings or sequences are to one another by counting the minimum number of operations required to transform one string into the other. Various types distance determinations may be utilized in accordance with the described embodiments, including and without limitation, the Levenshtein distance, the Hamming distance, the Damerau-Levenshtein distance, and the longest common sequence (LCS).

In some embodiments, perceptual hash comparer 320 is configured to determine distances between the perceptual hashes for pairs of media content items. In some embodiments, the distance is compared to a distance threshold. If the distance satisfies the distance threshold, e.g., is not greater than the distance threshold, the pair of media content items is identified as matching. In other words, these two media content items, while possibly not identical, or visually similar such that a user would perceive them as the same. In some embodiments, the media content items are marked within the media content library as matching. In some embodiments, the media content items are marked as matching in the search index.

Media content item grouper 330 is configured to received identification of visually similar items 325, e.g., the media content items indicated as matching, and to group visually similar items 325 together such that search results will only return one of the media content items grouped as matching, so as to eliminate visually duplicate items from the search results. In some embodiments, group indicator 335 is stored at a search index 340, where group indicator 335 indicates a group of visually similar media content items.

It should be appreciated that the search index 340 can be updated to include group information for new or newly analyzed media content items. The perceptual hash for the new media content item is compared to perceptual hashes at perceptual hash comparer 320 for the candidate list or all media content items (e.g., where no candidate list is generated). Based on the comparing, it is determined whether the new media content item matches a media content item of the media content item library. Provided the new media content item matches a media content item of the media content item library, the new media content item is grouped with the media content item of the media content item library and marked as matching. The media content library is updated accordingly.

Figure 4:
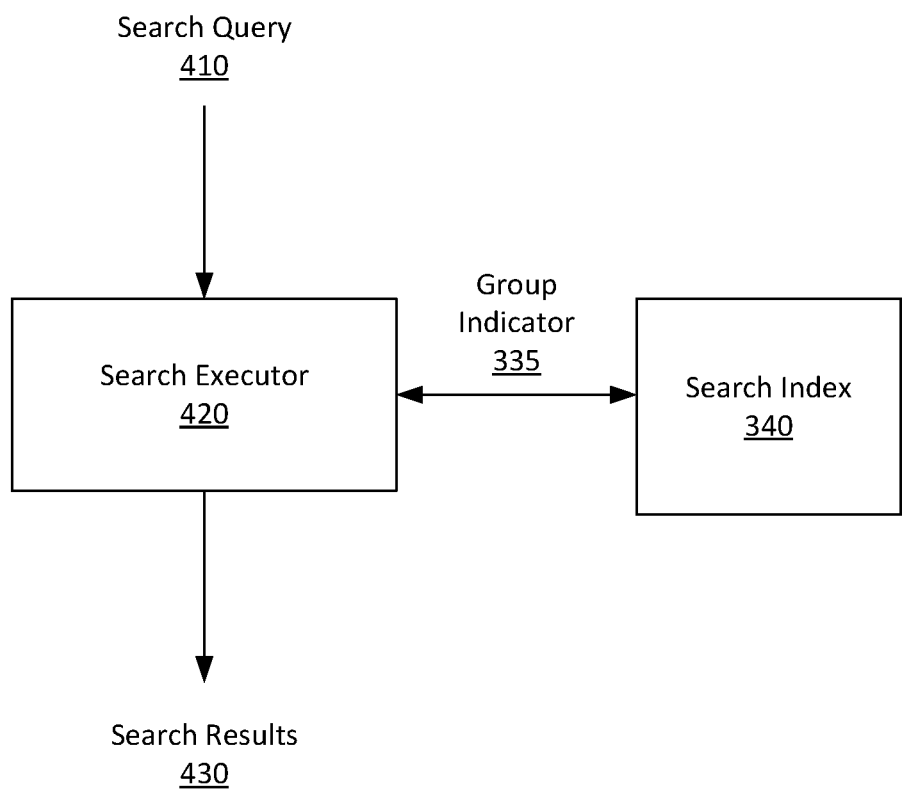
FIG. 4 illustrates an example search execution for returning deduplicated search results, according to an embodiment.

FIG. 4 illustrates an example search execution system 400 for returning deduplicated search results, according to an embodiment. System 400 includes search executor 420. It should be appreciated that the components of system 400 may be included within any combination of electronic devices, e.g., computer system 100 and/or a distributed computing system.

Search executor 420 is configured to receive search query 410. In some embodiments, a search query is received at the media content item library. The search is performed, and search results 430 to the search query 410 are returned, where the media content items indicated as matching are returned as a single result within the search results (e.g., deduplicated). In this manner, only visually dissimilar media content items are returned in the initial search results. In some embodiments, the single result is selectable such that the visually similar items can be reviewed such that a user can select one of the matching items.

In some embodiments, search executor 420 accesses search index 340 during search execution, where search index 340 provides group indicator 335. In some embodiments, media content items marked as matching are ranked according to various factors, such that the search results 430 return the one media content item representative of the matching media content items according to the factors. The factors may include, without limitation: resolution, quality, etc.

As presented above, identification of visually similar media content items, is important for facilitating the use of digital content. Providing search results that consolidate visually similar items into a single result improves the performance of digital content search by providing more diverse and representative results. The described embodiments may also be used to identify a history of a particular media content item, determining a first or early appearance of the item, as well as useful in identifying copyright violations, and tracing memes. Hence, the embodiments of the present invention greatly extend beyond conventional methods of identification of visually similar media content items. Moreover, embodiments of the present invention amount to significantly more than merely using a computer to perform identification of visually similar media content items. Instead, embodiments of the present invention specifically recite a novel process, rooted in computer technology, utilizing perceptual hashes for determining similar media content items, and providing search results based on the similar media content items such that duplicative information is not presented to a user, improving the user experience.

Example Methods of Operation of Deduplication of Media File Search Results

Figure 5:
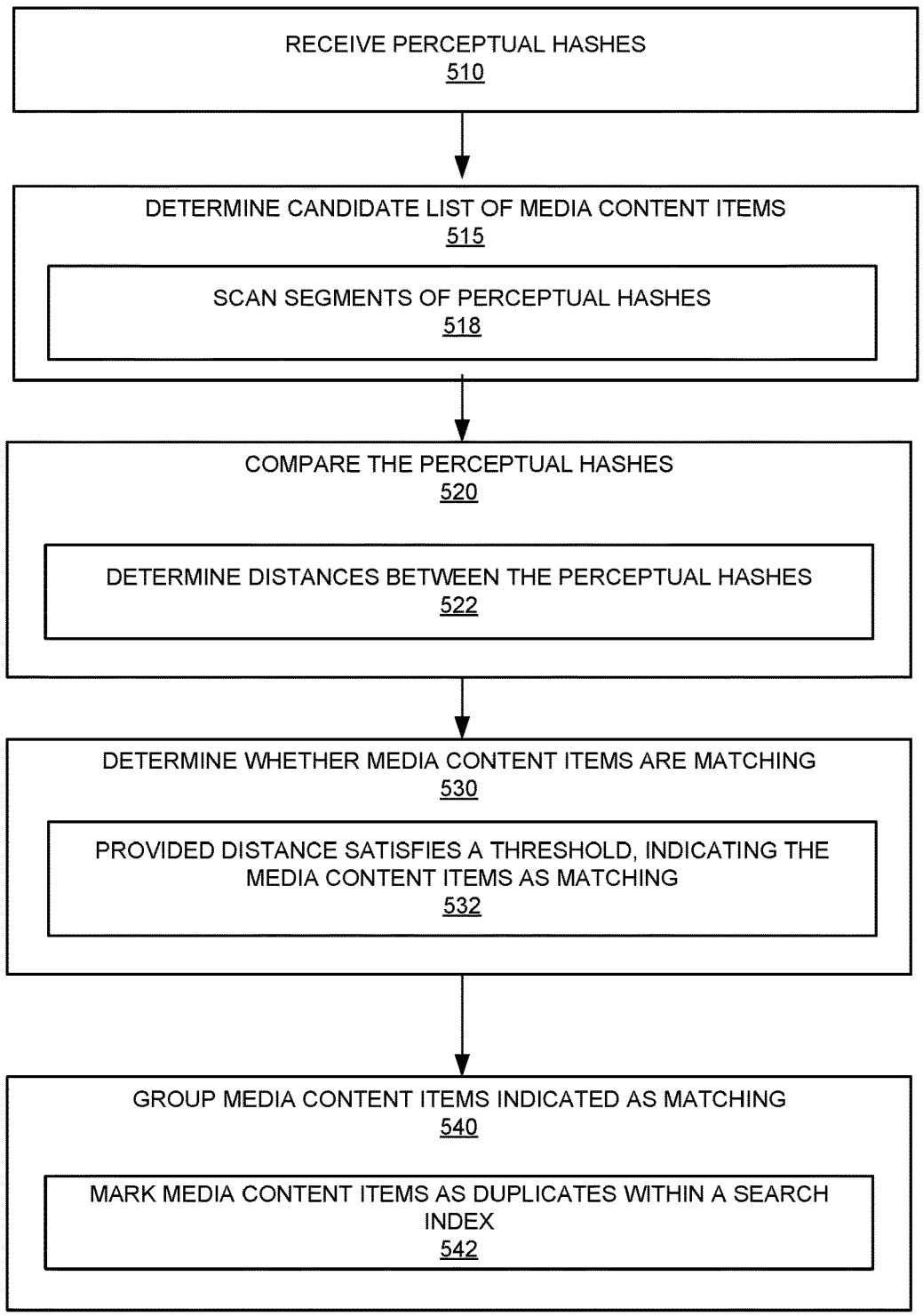
FIG. 5 illustrates a flow diagram of an example process for identifying visually similar media content items, according to various embodiments.

FIG. 5 illustrates an example flow diagram 500 of an example process for identifying visually similar media content items, according to various embodiments. At procedure 510 of flow diagram 500, perceptual hashes for video frames of media content items are received.

In one embodiment, as shown at procedure 515, a candidate list of media content items is determined. In one embodiment, the perceptual hashes are partitioned into segments. These segments are stored in a key value database, and an analysis is performed to identify the candidate list based on the words in the key value database. At procedure 518, the segments are scanned to determine a portion of video frames to be compared, also referred to as a candidate list.

At procedure 520, the perceptual hashes for at least a portion of video frames are compared (e.g., as identified by the candidate list). In one embodiment, as shown at procedure 522, distances between the perceptual hashes for the at least a portion of the video frames are determined. At procedure 530, based on the comparing the perceptual hashes for at least a portion of video frames, it is determined whether media content items are matching. In one embodiment, as shown at procedure 532, provided a distance between two perceptual hashes corresponding to two video frames satisfies a distance threshold, the media content items corresponding to video frames are indicated as matching.

At procedure 540, media content items indicated as matching are grouped together. In one embodiment, as shown at procedure 542, media content items indicated as matching are marked as duplicates within a search index.

Figure 6:
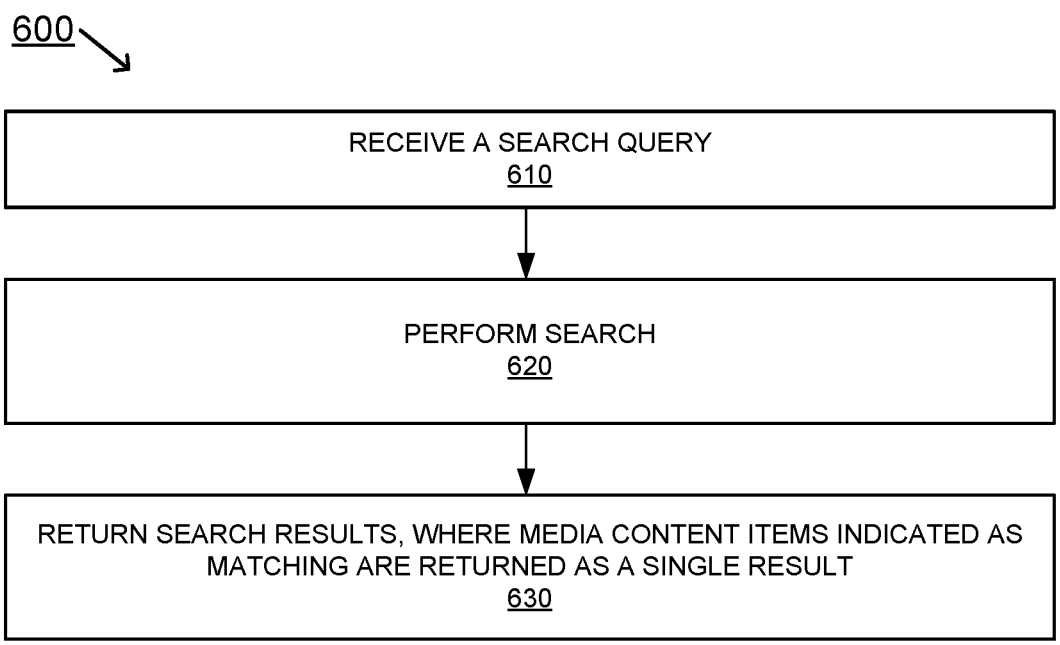
FIG. 6 flow diagram of an example process for performing a search, according to various embodiments.

FIG. 6 illustrates an example flow diagram 600 of an example process for performing a search, according to various embodiments. At procedure 610 of flow diagram 600, a search query is received at a media content items library. At procedure 620, the search is performed. At procedure 630, search results responsive to the search query are returned, wherein media content items indicated as matching are returned as a single result (e.g., deduplicated) within the search results.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for identifying visually similar media content items, the method comprising:
   receiving perceptual hashes for video frames of media content items;
   partitioning each of the perceptual hashes into segments including a first segment and a second segment;
   comparing the first segments of the perceptual hashes for at least a portion of video frames;
   determining, based on the comparing the first segments of the perceptual hashes for at least a portion of video frames, that media content items having perceptual hashes with identical first segments are candidate matches;
   grouping media content items indicated as being candidate matches together by first segment in a key value database;
   receiving a search query comprising a search query media content item; determining at least one perceptual hash for one or more video frames of the search query media content item;
   partitioning the at least one perceptual hash for the search query media content item into segments including a first segment and a second segment;
   identifying a group of potential match media content items for the search query media content item by comparing the first segment of the at least one perceptual hash for the search query media content item with the key value database;
   comparing the perceptual hashes in the group of potential match media content items with the at least one perceptual hash for the search query media content item; and
   providing a subset of the group of potential match media content items as search results in response to the search query, based on the comparison between the perceptual hashes of the group of potential match media content items with the at least one perceptual hash for the search query media content item.

2. The method of claim 1, wherein the comparing the perceptual hashes in the group of potential match media content items with the at least one perceptual hash for the search query media content item comprises:
   determining distances between the perceptual hashes in the group of potential match media content items and the at least one perceptual hash for the search query media content item.

3. The method of claim 2, further comprising:
   based on a distance between the perceptual hash of a particular media content item in the group of potential match media content items and the at least one perceptual hash for the search query media content item satisfying a distance threshold, including the particular media content item as search results in the subset of the group of potential match media content items.

4. The method of claim 1, wherein the media content items are stored within a media content item library.

5. The method of claim 1, further comprising:
   ranking the subset of the group of potential match media content items in the search results according to at least one factor.

6. The method of claim 1, wherein the grouping the media content items indicated as matching comprises:
   marking media content items that are matching as duplicates within a search index, such that media content items marked as duplicates are not included in the search results.

7. The method of claim 5, wherein the search results are ranked according to resolution or quality.

8. A non-transitory computer readable storage medium having computer readable program code stored thereon for causing a computer system to perform a method for identifying visually similar media content items, the method comprising:
   receiving perceptual hashes for video frames of media content items;
   partitioning each of the perceptual hashes into segments including a first segment and a second segment;
   scanning the first segments of the perceptual hashes of the media content items to identify media content items having perceptual hashes with identical first segments as candidate matches;
   grouping media content items indicated as being candidate matches together by first segment in a key value database;
   receiving a search query comprising a search query media content item;
   determining at least one perceptual hash for one or more video frames of the search query media content item;
   partitioning the at least one perceptual hash for the search query media content item into segments including a first segment and a second segment;
   identifying a group of potential match media content items for the search query media content item by comparing the first segment of the at least one perceptual hash for the search query media content item with the key value database;
   comparing the perceptual hashes in the group of potential match media content items with the at least one perceptual hash for the search query media content item; and
   providing a subset of the group of potential match media content items as search results in response to the search query, based on the comparison between the perceptual hashes of the group of potential match media content items with the at least one perceptual hash for the search query media content item.

9. The non-transitory computer readable storage medium of claim 8, wherein the comparing the perceptual hashes in the group of potential match media content items with the at least one perceptual hash for the search query media content item comprises:
   determining distances between the perceptual hashes in the group of potential match media content items and the at least one perceptual hash for the search query media content item.

10. The non-transitory computer readable storage medium of claim 9, wherein the method further comprises:
    based on a distance between the perceptual hash of a particular media content item in the group of potential match media content items and the at least one perceptual hash for the search query media content item satisfying a distance threshold, including the particular media content item as search results in the subset of the group of potential match media content items.

11. The non-transitory computer readable storage medium of claim 8, wherein the media content items are stored within a media content item library.

12. The non-transitory computer readable storage medium of claim 8, the method further comprising:
ranking the subset of the group of potential match media content items in the search results according to at least one factor.

13. The non-transitory computer readable storage medium of claim 8, wherein the grouping the media content items indicated as matching comprises:
marking media content items that are matching as duplicates within a search index, such that media content items marked as duplicates are not included in the search results.

14. A computer system comprising:
a data storage unit; and
a processor coupled with the data storage unit, the processor configured to:
receive perceptual hashes for video frames of media content items;
partition each of the perceptual hashes into segments including a first segment and a second segment;
scan the first segments of the perceptual hashes of the media content items to identify media content items having perceptual hashes with identical first segments as candidate matches;
group media content items indicated as being candidate matches together by first segment in a key value database;
receive a search query comprising a search query media content item;
determine at least one perceptual hash for one or more video frames of the search query media content item;
partition the at least one perceptual hash for the search query media content item into segments including a first segment and a second segment;
identify a group of potential match media content items for the search query media content item by comparing the first segment of the at least one perceptual hash for the search query media content item with the key value database;
compare the perceptual hashes in the group of potential match media content items with the at least one perceptual hash for the search query media content item; and
provide a subset of the group of potential match media content items as search results in response to the search query, based on the comparison between the perceptual hashes of the group of potential match media content items with the at least one perceptual hash for the search query media content item.

* * * * *

UNITED STATES PATENT AND TRADEMARK OFFICE
CERTIFICATE OF CORRECTION

PATENT NO. : 11,449,545 B2
APPLICATION NO. : 15/930127
DATED : September 20, 2022
INVENTOR(S) : Harris et al.

Page 1 of 1

It is certified that error appears in the above-identified patent and that said Letters Patent is hereby corrected as shown below:

In the Claims

In Column 13, Line 31, in Claim 1, after "item;", insert a line break.

In Column 15, Line 5, in Claim 11, delete "claim 8 ," and insert --claim 8,-- therefor.

Signed and Sealed this
Twenty-seventh Day of June, 2023

Katherine Kelly Vidal
*Director of the United States Patent and Trademark Office*